(12) United States Patent
Kaufold et al.

(10) Patent No.: US 8,419,139 B2
(45) Date of Patent: Apr. 16, 2013

(54) TANK WHEEL ASSEMBLY WITH WEAR RESISTANT COATING

(75) Inventors: Roger W. Kaufold, Pittsburgh, PA (US); Ian D. L. Murray, Avon, OH (US)

(73) Assignee: Alcoa Inc., Pittsburgh, PA (US)

( * ) Notice: Subject to any disclaimer, the term of this patent is extended or adjusted under 35 U.S.C. 154(b) by 261 days.

(21) Appl. No.: 12/684,820

(22) Filed: Jan. 8, 2010

(65) Prior Publication Data
US 2011/0169325 A1 Jul. 14, 2011

(51) Int. Cl.
*B62D 55/24* (2006.01)
(52) U.S. Cl.
USPC .............. 305/194; 305/137; 305/173
(58) Field of Classification Search .......... 305/137, 305/165, 167, 173, 194, 199; 508/108
See application file for complete search history.

(56) References Cited

U.S. PATENT DOCUMENTS

| | | | | |
|---|---|---|---|---|
| 2,984,524 A | * | 5/1961 | Franzen | 305/194 |
| 3,007,745 A | * | 11/1961 | Even | 305/200 |
| 3,606,497 A | * | 9/1971 | Gilles | 305/194 |
| 3,929,385 A | * | 12/1975 | Turkiewicz et al. | 305/194 |
| 4,098,654 A | * | 7/1978 | Helle et al. | 205/50 |
| 4,349,234 A | * | 9/1982 | Hartmann | 305/194 |
| 4,607,892 A | * | 8/1986 | Payne et al. | 305/137 |
| 5,141,299 A | | 8/1992 | Korpi | 305/56 |
| 5,171,074 A | * | 12/1992 | Seksaria et al. | 305/137 |
| 5,210,948 A | * | 5/1993 | Seksaria et al. | 29/894 |
| 5,302,414 A | | 4/1994 | Alkhimov et al. | 427/192 |
| 5,413,407 A | * | 5/1995 | Warner | 305/197 |
| 5,540,489 A | * | 7/1996 | Muramatsu et al. | 305/197 |
| 5,795,626 A | | 8/1998 | Gabel et al. | 427/458 |
| 5,884,388 A | | 3/1999 | Patrick et al. | 29/527.2 |
| 6,290,032 B1 | | 9/2001 | Patrick et al. | 188/218 |
| 6,386,654 B1 | * | 5/2002 | Singer et al. | 305/194 |
| 6,551,664 B2 | | 4/2003 | Kaufold et al. | 427/447 |
| 6,702,886 B2 | | 3/2004 | Whittle et al. | 106/38.27 |
| 6,872,425 B2 | | 3/2005 | Kaufold et al. | 427/404 |

(Continued)

FOREIGN PATENT DOCUMENTS
EP 302988 A1 * 2/1989
EP 360974 A2 * 4/1990

OTHER PUBLICATIONS

Machine Translation of EP 302988 A1 [Retrieved on Dec. 15, 2011].*

(Continued)

*Primary Examiner* — Kip T Kotter
(74) *Attorney, Agent, or Firm* — Greenberg Traurig, LLP (57) ABSTRACT

The present disclosure relates to tank wheel assembly systems, methods, and apparatus. In one embodiment, a tank wheel assembly includes a first wheel and a second wheel. A first face of the first wheel faces a second face of the second wheel. A guide tunnel is defined by at least a portion of the first face and at least a portion of the second face. The guide tunnel has outer surfaces and is configured to receive a center guide of a tank tread. The guide tunnel and center guide at least partially maintain the tank tread of the tank wheel assembly. A wear resistant coating is located on at least a portion of the outer surfaces of the guide tunnel, restricts the center guide of the tank tread from abrading the outer surfaces of the guide tunnel, and has a thickness of at least about 0.025 inch.

9 Claims, 6 Drawing Sheets

U.S. PATENT DOCUMENTS

| | | | |
|---|---|---|---|
| 6,881,491 B2 | 4/2005 | Jankosky et al. | 428/472.2 |
| 7,137,675 B1* | 11/2006 | Simula et al. | 305/194 |
| 7,407,236 B2* | 8/2008 | Fukushima | 305/171 |
| 2003/0160506 A1* | 8/2003 | Averkamp et al. | 305/136 |
| 2005/0103540 A1* | 5/2005 | Lavoie | 180/9.1 |
| 2008/0136255 A1* | 6/2008 | Feldmann et al. | 305/167 |
| 2009/0061218 A1 | 3/2009 | Levendusky et al. | 428/336 |
| 2009/0102281 A1* | 4/2009 | Diekevers et al. | 305/104 |
| 2009/0162544 A1 | 6/2009 | Garesche et al. | 427/202 |
| 2010/0007206 A1* | 1/2010 | Wodrich | 305/198 |

OTHER PUBLICATIONS

List of Road Wheel Products, retrieved from the Internet at http://www.vanhalterenmetaal.nl/upload/product_doc/RW_Animated_product_view.pdf, on Apr. 21, 2010, from website of Van Halteren Metaal BV (VHM), Bunschoten, the Netherlands.

* cited by examiner

TANK WHEEL ASSEMBLY WITH WEAR RESISTANT COATING

BACKGROUND

Tank vehicles generally include road wheels and a tank track having a center guide. The road wheels and center guide assist in keeping the tank track on the tank vehicle. A steel wear ring is commonly used to restrict the center guide of the tank track from abrading the road wheels. The steel wear ring weighs about 15 lbs. and requires 18 bolts and supporting hardware to mount the steel wear ring to the wheel surface.

SUMMARY OF THE DISCLOSURE

The present disclosure relates to tank vehicle systems, methods, and apparatus. These tank vehicle systems, methods and apparatus include a tank wheel assembly having tank wheels and a tank tread with a center guide to maintain the tank tread on the tank wheel assembly. A light weight, wear resistant coating may be located on a portion of the tank wheels to limit abrasion to the tank wheels due to movement of the center guide of the tank tread through the tank wheels during normal vehicle operation. These wear resistant coatings facilitate, among other things, a reduction in weight of the tank wheel assembly.

In one embodiment, a tank wheel assembly includes a first tank wheel disposed about an axle, and a second tank wheel proximal the first wheel and disposed about the axle. A first face of the first tank wheel faces a second face of the second tank wheel. A guide tunnel is defined by at least a portion of the first face and at least a portion of the second face. The guide tunnel has outer surfaces and is configured to receive a center guide of a tank tread. The guide tunnel and center guide at least partially maintain the tank tread on the tank wheel assembly. A wear resistant coating is located on at least a portion of the outer surfaces of the guide tunnel. The wear resistant coating may be adherent to the outer surfaces of the guide tunnel and may have a thickness of at least about 0.025 inch.

The use of wear resistant coatings of these thicknesses may facilitate improved abrasion resistance and thus lifetime of the tank wheels. In one embodiment, the wear resistant coating may restrict the center guide of the tank tread from abrading the outer surfaces of the guide tunnel. In one embodiment, the wear resistant coating may restrict abrading of the outer surfaces of the guide tunnel for at least 2500 hours of field use. For example, the wear resistant coating may limit and/or prevent wear of the guide tunnel (e.g., removal of a portion of the outer surface of the guide tunnel) due to movement of the center guide of the tank tread through the guide tunnel when the tank wheel assembly operates under normal conditions. In one embodiment, the wear resistant coating may restrict direct physical contact between the center guide of the tank tread and the outer surfaces of the guide tunnel.

In one embodiment, not greater than 10 vol. % of the wear resistant coating is lost when tested in accordance with ASTM G105-02. In one embodiment, not greater than 10 vol. % of the wear resistant coating is lost when tested in accordance with ASTM G65-04. In one embodiment, the wear resistant coating may have a hardness of at least about 1000 Vickers. In one embodiment, the wear resistant coating may have a density of at least about $7.0 \text{ g/cm}^3$. In one embodiment, the wear resistant coating may have a porosity of not greater than about 2%. In one embodiment, the wear resistant coating may have a tensile yield strength of at least about 10,000 psi as measured in accordance with ASTM C633-01. In one embodiment, no visible pitting of at least one of the first tank wheel and second tank wheel having a wear resistant coating of at least 0.025 inch on its outer surface is realized when tested in accordance with ASTM B117-03. Pitting of the tank wheels is assessed on the coated surfaces only.

In one embodiment, the tank wheel assembly may include a wear resistant coating located on at least a portion of the center guide of the tank tread. Like the tank wheel, this wear resistant coating may restrict the center guide of the tank tread from abrading the outer surfaces of the guide tunnel. A synergy may exist between this wear resistant coating and the wear resistant coating located on the tank wheels to facilitate improved abrasion resistance of the tank wheels. These wear resistant coatings may comprise at least one of an Fe-Balance alloy, a Ni-Balance alloy, Colmonoy 88, an iron oxinitride impregnated with a polymer and a cobalt nickel alloy infused with a fluorocarbon.

In another aspect, methods of producing wear resistant tank wheel assemblies are provided. In one embodiment, a method includes first applying a first wear resistant coating to a first face of a first tank wheel, second applying a second wear resistant coating to a second face of a second tank wheel, assembling a tank wheel assembly comprising the first tank wheel and the second tank wheel, and operating a tank comprising the tank wheel assembly. After the first and second applying steps, each of the first and second wear resistant coatings may have a thickness of at least about 0.025 inch. After the assembly step, the first face of the first tank wheel faces the second face of the second tank wheel. At least a portion of the first face and at least a portion of the second face may define a guide tunnel, and the guide tunnel may be configured to receive a center guide of a tank tread. During the operating step, the first and second wear resistant coatings may restrict abrading of the first and second tank wheels due to movement of the center guide of the tank tread through the guide tunnel.

In one embodiment, the method may include applying a third wear resistant coating to at least a portion of the center guide of the tank tread. In one embodiment, the third wear resistant coating is the same as the first wear resistant coating. In embodiment, the third wear resistant coating is different than the first wear resistant coating. In one embodiment, the first wear resistant coating comprises at least one of an Fe-Balance alloy, a Ni-Balance alloy, and Colmonoy 88, and the third wear resistant coating comprises at least one of an iron oxinitride impregnated with a polymer and a cobalt nickel alloy infused with a fluorocarbon.

Various ones of the unique aspects noted hereinabove may be combined to yield various tank vehicle systems, methods and apparatus. These and other aspects, advantages, and novel features of the disclosure are set forth in part in the description that follows and will become apparent to those skilled in the art upon examination of the following description and figures, or may be learned by practicing the disclosure.

DETAILED DESCRIPTION

Reference will now be made in detail to the accompanying drawings, which at least assist in illustrating various pertinent embodiments of the present disclosure.

The present disclosure relates to tank vehicle systems, methods, and apparatus. These tank vehicle systems, methods and apparatus include a tank wheel assembly having tank wheels and a tank tread with a center guide to maintain the tank tread on the tank wheel assembly. A light weight, wear resistant coating may be located on a portion of the tank wheels to limit abrasion to the tank wheels due to movement of the center guide of the tank tread through the tank wheels during normal vehicle operation. These wear resistant coatings facilitate, among other things, a reduction in weight of the tank wheel assembly.

Figure 1:
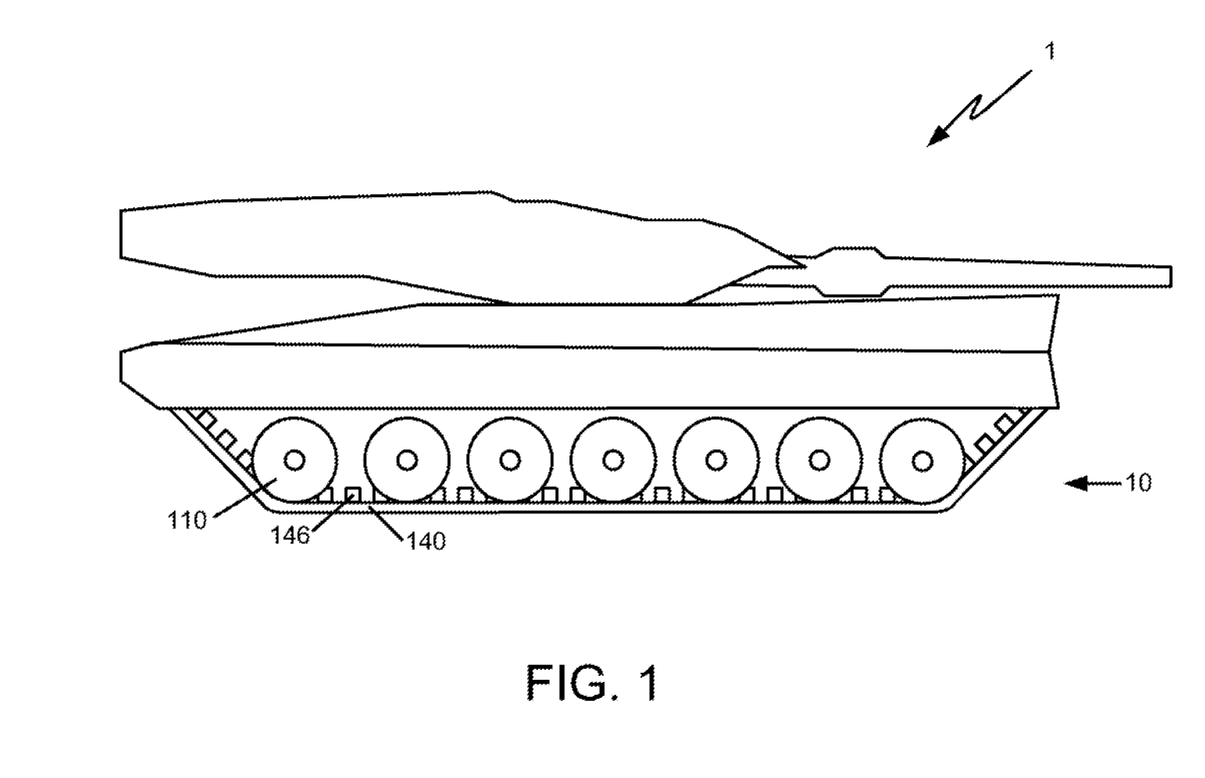
FIG. 1 is a perspective view of one embodiment of a tank vehicle useful in accordance with the present disclosure.
Figure 2:
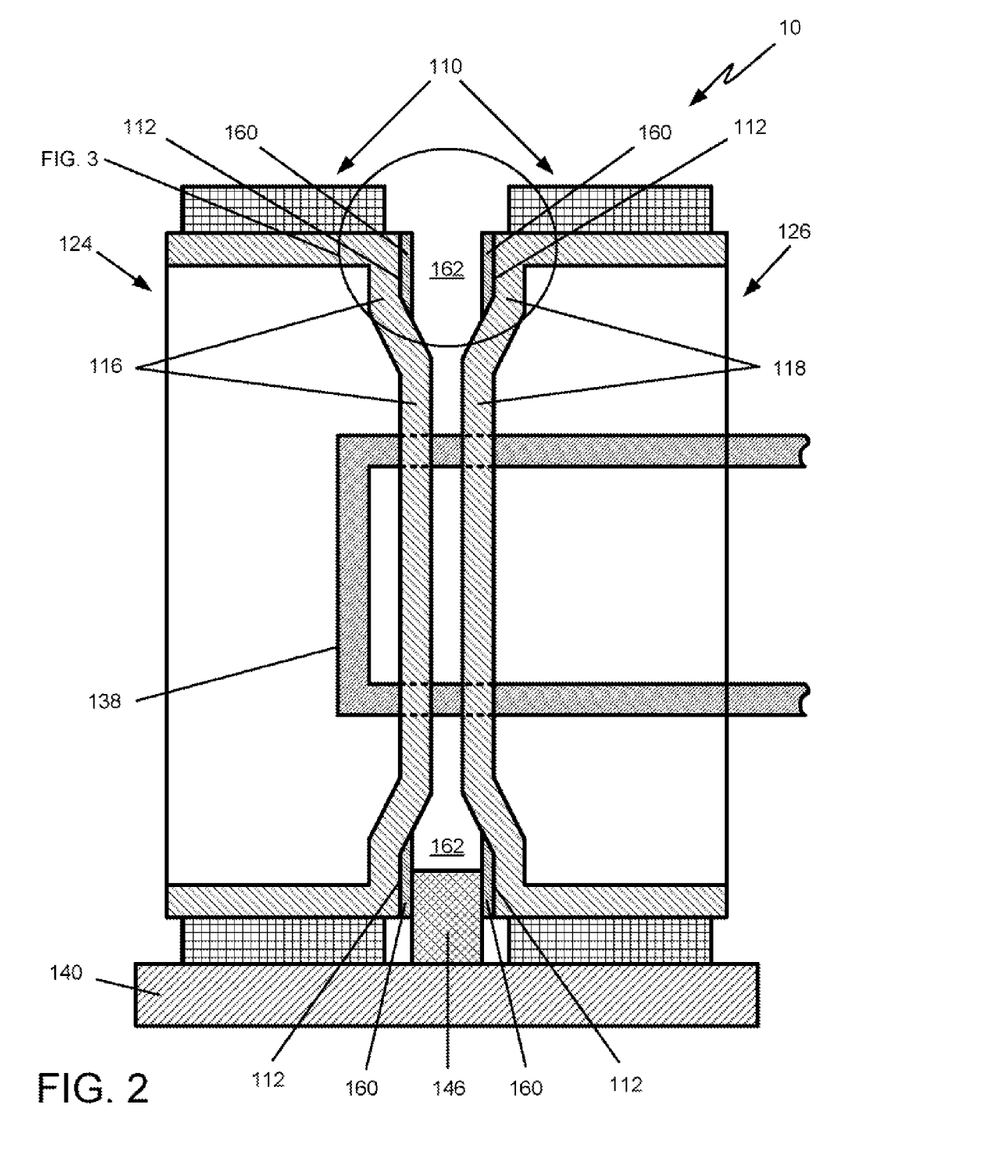
FIG. 2 is a perspective view of one embodiment of a tank wheel assembly useful in accordance with the present disclosure.
Figure 3:
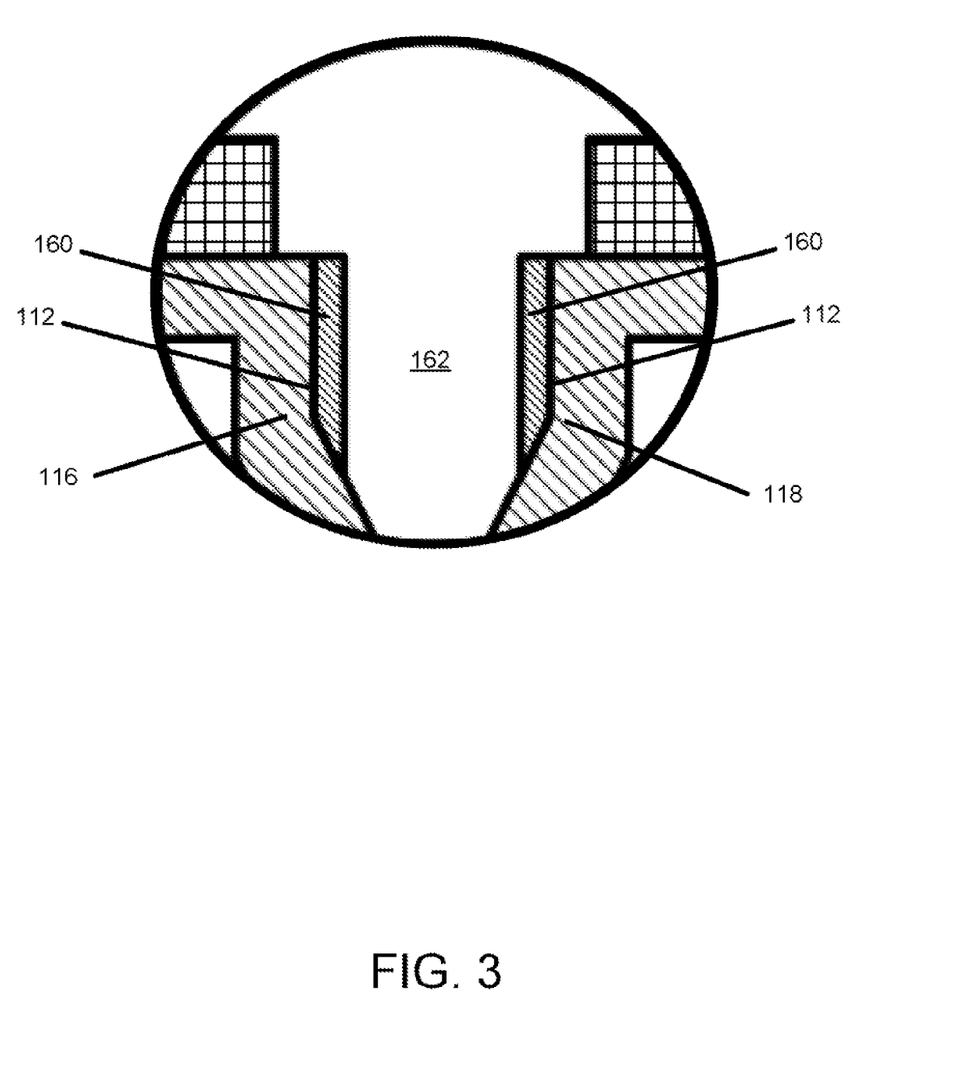
FIG. 3 is an enlarged view of the guide tunnel of FIG. 2.

One embodiment of a tank, and a tank wheel assembly, is illustrated in FIGS. 1-3. In the illustrated embodiment, the tank 1 includes a tank wheel assembly 10, which includes tank wheels 110 and a tank tread 140 having a center guide 146. As illustrated in FIG. 2, the tank wheels 110 may include a first tank wheel 124 and second tank wheel 126 disposed about an axle 138 and a guide tunnel 162 defined by at least a portion of a first face 116 of the first tank wheel 124 and at least a portion of a second face 118 of the second tank wheel 126. As illustrated in FIGS. 2 and 3, the guide tunnel 162 may have outer surfaces 112 and may be configured to receive the center guide 146 of the tank tread 140. A wear resistant coating 160 is located on at least a portion of the first face 116 and the second face 118.

While the tank 1 is in operation, the center guide 146 of the tank tread 140 moves through the guide tunnel 162. The guide tunnel 162 and the center guide 146 may at least partially maintain the tank tread 140 on the tank wheel assembly 10, as the center guide 146 moves through the guide tunnel 162. As the center guide 146 moves through the guide tunnel 162, the center guide 146 may directly contact the outer surfaces 112 of the guide tunnel 162, and may cause abrasion of the outer surfaces 112 of the guide tunnel 162. The wear resistant coating 160 may limit and/or prevent direct physical contact between the outer surfaces 112 of the guide tunnel 162 and the center guide 146 of the tank tread 140.

In one embodiment, the wear resistant coating 160 may restrict the center guide 146 of the tank tread 140 from abrading the outer surfaces 112 of the guide tunnel 162. For example, the wear resistant coating 160 may limit and/or prevent wear of the guide tunnel 162 (e.g., removal of a portion of the outer surfaces 112 of the guide tunnel 162) due to movement of the center guide 146 of the tank tread 140 through the guide tunnel 162. In one embodiment, the wear resistant coating 160 passes ASTM G65-04, entitled "Standard Test Method for Measuring Abrasion Using the Dry Sand/Rubber Wheel Apparatus." In one embodiment, the wear resistant coating 160 passes ASTM G105-02 (2007), entitled "Standard Test Method for Conducting Wet Sand/Rubber Wheel Abrasion Tests." In some these embodiments, and with reference to both the ASTM G65-04 and ASTM G105-02 (2007) tests, a pass means that not greater than 10 vol. % of wear resistant coating 160 is lost during one or more of these tests. In others of these embodiments, a pass means that not greater than about 8 vol. %, or not greater than about 6 vol. %, or not greater than about 4 vol. %, or not greater than about 2 vol. %, or not greater than about 1 vol. % of the wear resistant coating 160 is lost during one or more of these tests.

In one embodiment, the wear resistant coating 160 restricts abrading of the outer surfaces 112 of the guide tunnel 162 such that the guide tunnel 162 has a lifetime similar to that of a guide tunnel 162 having a 1040 steel wear ring. For example, the wear resistant coating 160 may have a lifetime equal to the average lifetime of a 1040 steel wear ring. In one embodiment, the wear resistant coating 160 may have a lifetime greater than the average lifetime of a 1040 steel wear ring. In one embodiment, the wear resistant coating 160 may facilitate substantial wear resistance of the tank wheels 110, such that at least one of the first tank wheel 124 and the second tank wheel 126 may have a commercially viable lifetime. Commercially viable lifetime means that the wear resistance coating 160 restricts abrading of the outer surfaces 112 of the guide tunnel 162 for at least 2500 hours of field use. Field use means operating the tank wheel assembly 10 under normal operating conditions.

In one embodiment, the wear resistant coating 160 may be located on, and adherent to, at least a portion of the outer surfaces 112 of the guide tunnel 162. Adherent to the outer surfaces 112 of the guide tunnel 162 means that the wear resistant coating 160 is capable of passing ASTM C633-01, entitled, "Standard Test Method for Adhesion or Cohesion Strength of Thermal Spray Coatings." For example, the wear resistant coating 160 may have a tensile yield strength of at least about 10,000 psi.

In one embodiment, and with reference now to FIG. 2, the first tank wheel 124 may be proximal the second tank wheel 126. The first face 116 of the first tank wheel 124 may face the second face 118 of the second tank wheel 126. In one embodiment, the tank wheels 110 with the wear resistant coating 160 on its outer surfaces 112 are corrosion resistant. For example, some coatings accelerate deterioration of aluminum alloys. The instant wear resistant coating 160 may not naturally accelerate corrosion of the aluminum alloy tank wheels. In one embodiment, a tank wheel 110 having the wear resistant coating 160 of a thickness of at least 0.025 inch on its outer surface 112 is capable of passing ASTM B117-03, entitled, "Standard Practice for Operating Salt Spray (Fog) Apparatus." In one embodiment, a pass means that this tank wheel 110 is exposed to the salt spray test for at least about 500 hours, and no visible pitting of the coated surface of the tank wheel 110 is shown and/or realized.

To achieve one or more of the above properties the wear resistant coating 160 may have a relatively high thickness. In one embodiment, the wear resistant coating 160 has an average thickness of at least about 0.025 inch. In other embodiments, the wear resistant coating 160 has an average thickness of at least about 0.03 inch, or at least about 0.035 inch, or at least about 0.04 inch, or at least about 0.045 inch, or at least about 0.05 inch, or at least about 0.055 inch, or at least about 0.06 inch, or at least about 0.065 inch, or at least about 0.07 inch, or at least about 0.075 inch, or at least about 0.08 inch, or at least about 0.085 inch, or at least about 0.09 inch, or at least about 0.095 inch, or at least about 0.1 inch, or at least about 0.105 inch, or at least about 0.11 inch, or at least about 0.115 inch, or at least about 0.12 inch, or at least about 0.125 inch, or at least about 0.13 inch, or at least about 0.135 inch, or at least about 0.14 inch or at least about 0.145 inch, or at least about 0.15 inch.

To achieve one or more of the above properties the wear resistant coating 160 may generally have a hardness of 1100 Vickers (Hv300). The hardness of the wear resistant coating 160 may be measured using a micro-hardness indenter that is set to a 300 gram load. In one embodiment, the wear resistant coating 160 has a hardness of at least about 1000 Vickers (Hv300). In other embodiments, the wear resistant coating 160 has a hardness of at least about 1050 Vickers (Hv300), or at least about 1100 Vickers (Hv300), or at least about 1150 Vickers (Hv300), or at least about 1200 Vickers (Hv300), or at least about 1250 Vickers (Hv300). In one embodiment, the wear resistant coating 160 has a hardness in the range of about 1000 Vickers (Hv300) to about 1250 Vickers (Hv300).

To achieve one or more of the above properties the wear resistant coating 160 may generally have a density of about 7.6 g/cm$^3$. In one embodiment, the wear resistant coating 160 has a density of at least about 7.0 g/cm$^3$. In other embodiments, the wear resistant coating 160 has a density of at least about 7.5 g/cm$^3$, or at least about 8.0 g/cm$^3$, or at least about 8.5 g/cm$^3$, or at least about 9.0 g/cm$^3$, or at least about 9.5 g/cm$^3$, or at least about 10.0 g/cm$^3$, or at least about 10.5 g/cm$^3$, or at least about 11.0 g/cm$^3$, or at least about 11.5 g/cm$^3$, or at least about 12.0 g/cm$^3$, or at least about 12.5 g/cm$^3$, or at least about 13.0 g/cm$^3$. In one embodiment, the wear resistant coating 160 has a density in the range of about 7.0 g/cm$^3$ to about 13.0 g/cm$^3$.

To achieve one or more of the above properties the wear resistant coating 160 may have a relatively low porosity. The porosity of the wear resistant coating 160 may be measured using gray scale software. For example, the percentage of black area in an image of the wear resistant coating 160 at 200× magnification is measured to determine the porosity. In one embodiment, the wear resistant coating 160 has a porosity of not greater than about 2%. In other embodiments, the wear resistant coating 160 has a porosity of not greater than about 1.5%, or not greater than about 1%, or not greater than about 0.5%. In one embodiment, the wear resistant coating 160 has a porosity in the range of about 0.5% to about 2%.

To achieve one or more of the above properties the wear resistant coating 160 may be made from an Fe-Balance alloy. In one embodiment, the wear resistant coating 160 is an Fe-Balance alloy and is comprised of about 25 wt. % Cr, 8 wt. % Nb, 7 wt. % B, 2 wt. % C, 2 wt. % Mn, and 2 wt. % Si. In one embodiment, the wear resistant coating 160 is an Fe-Balance alloy and is comprised of about 25 wt. % Cr, 15 wt. % W, 12 wt. % Nb, 6 wt. % Mb, 5 wt. % B, 4 wt. % C, 3 wt. % Mn, and 2 wt. % Si. In one embodiment, the wear resistant coating 160 is an Ni-Balance alloy and is comprised of about 17 wt. % Cr, 4 wt. % Fe, 4 wt. % Si, and 1 wt. % C. In one embodiment, the wear resistant coating 160 is Colmonoy 88.

To further facilitate wear resistance, the center guide 146 may also/alternatively include a coating on its outer surface. For example, and with reference now to FIG. 4, a second wear resistant coating 460 may be located on at least a portion of the center guide 146 of the tank tread 140. In one embodiment, the second wear resistant coating 460 may limit and/or prevent direct physical contact between the first and second faces 116/118 of the tank wheels 110 and the center guide 146 of the tank tread 140. In one embodiment, the second wear resistant coating 460 may restrict the center guide 146 of the tank tread 140 from abrading the outer surfaces 112 of the guide tunnel 162. In one embodiment, the second wear resistant coating 460 may facilitate substantial wear resistance of the tank wheels 110, such that at least one of the first tank wheel 124 and the second tank wheel 126 may have a commercially viable lifetime.

Figure 4:
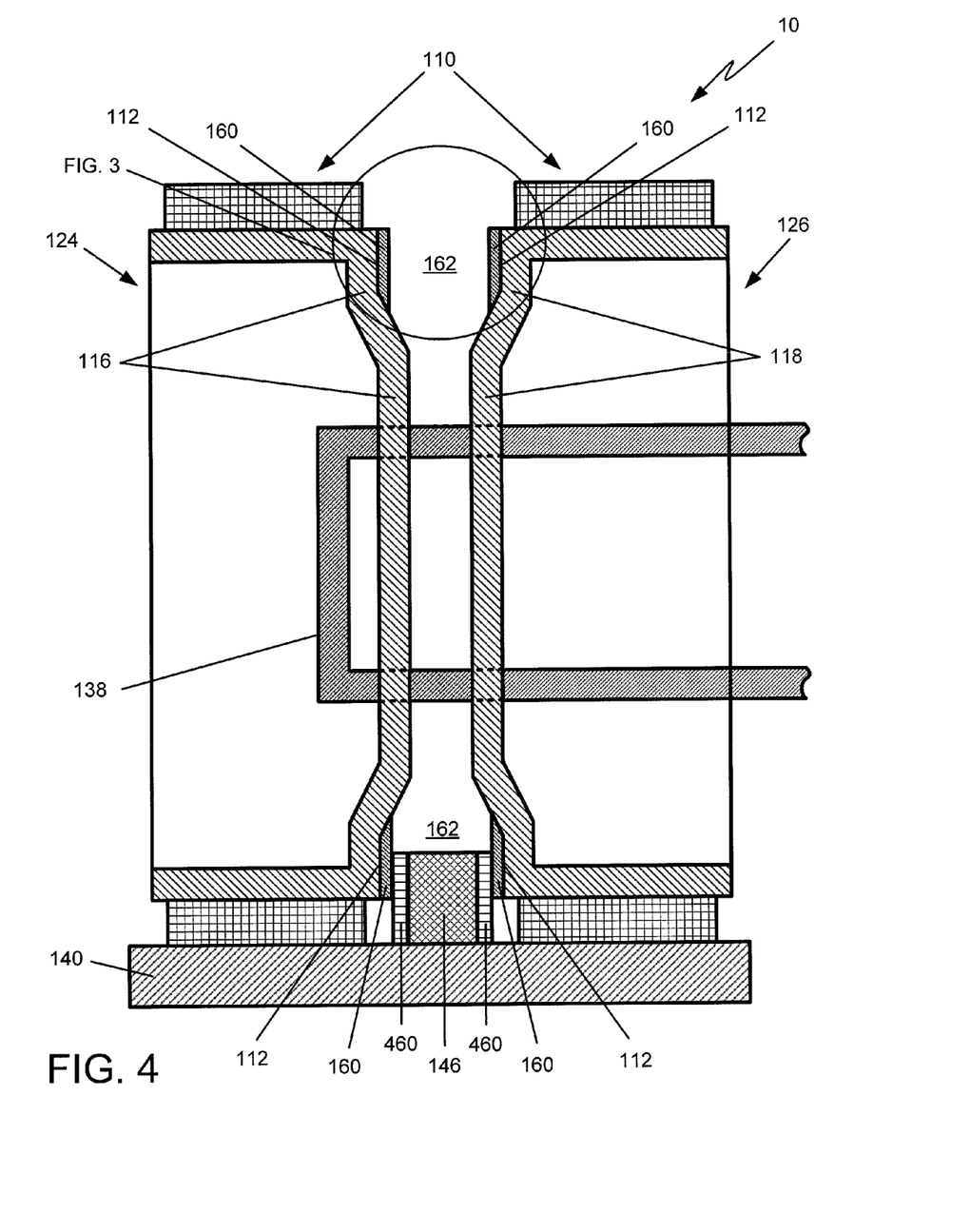
FIG. 4 is a perspective view of one embodiment of a tank wheel assembly useful in accordance with the present disclosure.

In one embodiment, the second wear resistant coating 460 may comprise any of the coatings used above, i.e., the compositions used for wear resistant coating 160 may be used for the second wear resistant coating 460. Additionally, in some embodiments, the compositions used for the second wear resistant coating 460 may be used for the wear resistant coating 160. In one embodiment, the wear resistant coating 160 is the same as the second wear resistant coating 460. In one embodiment, the wear resistant coating 160 is different than the second wear resistant coating 460. In one example, the center guide 146 may have the second wear resistant coating 460 on its outer surface and the guide tunnel 162 may have the second wear resistant coating 460 on its outer surfaces 112. In another example, the center guide 146 may have the wear resistant coating 160 on its outer surface and the guide tunnel 162 may have the second wear resistant coating 460 on its outer surfaces 112. Other combinations and permutations may be used.

In one embodiment, the second wear resistant coating 460 comprises iron oxinitride impregnated with a polymer. In one embodiment, the second wear resistant coating 460 comprises a cobalt nickel alloy infused with a fluorocarbon. In one embodiment, the second wear resistant coating 460 is applied via ferritic nitrocarburizing. The coefficient of friction between the first wear resistant coating 160 and the second wear resistant coating 460 is generally low. In one embodiment, the coefficient of friction between the first wear resistant coating 160 and the second wear resistant coating 460 is not greater than about 0.35. The heat generation and adhesion between the asperities of the two coatings 160/460 is low due to the low coefficient of friction between the two coatings 160/460, therefore galling does not occur. In this regard, a synergy may exist between the first wear resistant coating 160 and the second wear resistant coating 460 such that improved abrasion resistance of the tank wheels 110 is achieved. When the first wear resistant coating 160 is the same as the second wear resistant coating 460, heat and adhesion between the asperities of the two coatings 160/460 may exist, causing galling. In this regard, the wear resistant coatings 160/460 are generally not the same, but in some embodiments, it may be useful for the wear resistant coatings 160/460 to be the same.

Figure 5A:
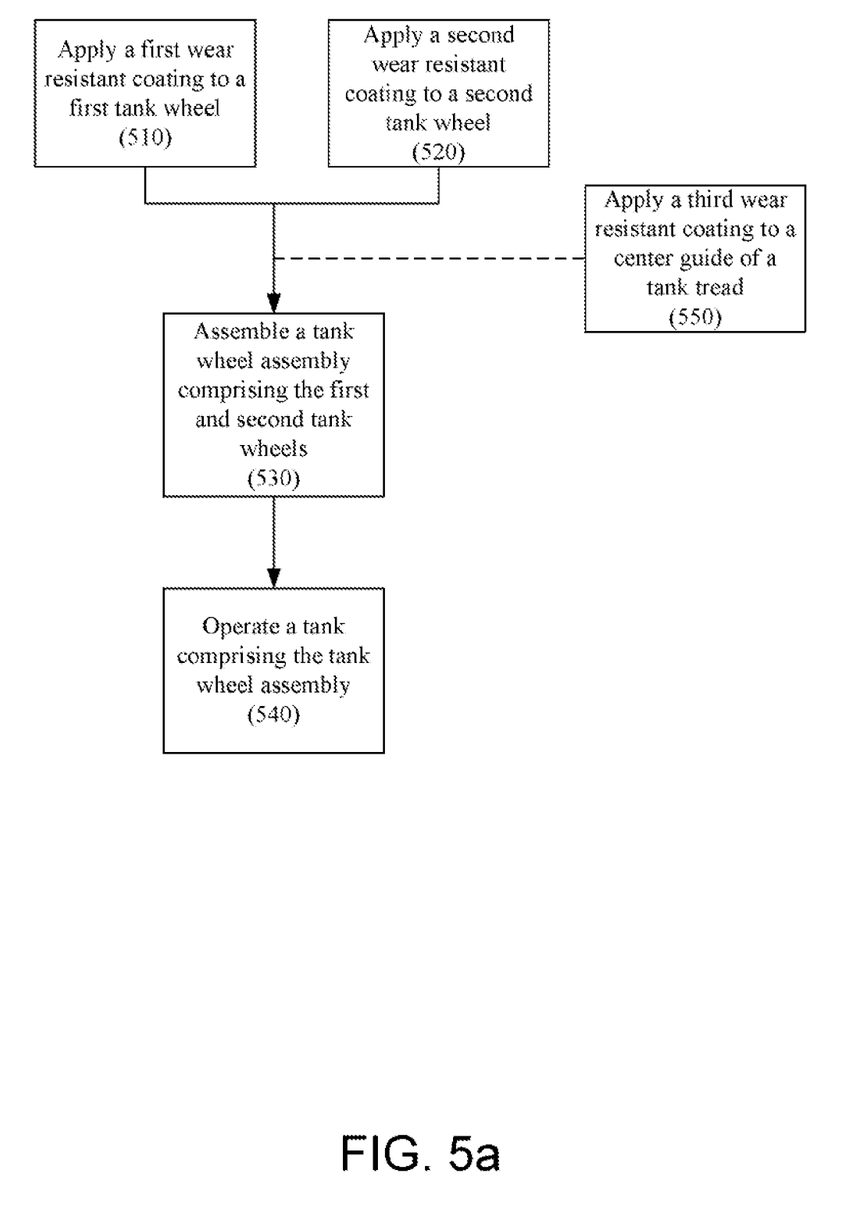
FIG. 5a is a flow chart of one embodiment of methods useful in producing wear resistant tank wheel assemblies.

Methods of producing wear resistant tank wheel assemblies are also provided. In one embodiment, and with reference to FIG. 5a, the method includes the steps of applying a first wear resistant coating to a first tank wheel (510), applying a second wear resistant coating to a second tank wheel (520), assembling a tank wheel assembly comprising the first and second tank wheels (530), and operating a tank comprising the tank wheel assembly (540). The method may include the step of applying a third wear resistant coating to a center guide of a tank tread (550).

Figure 5B:
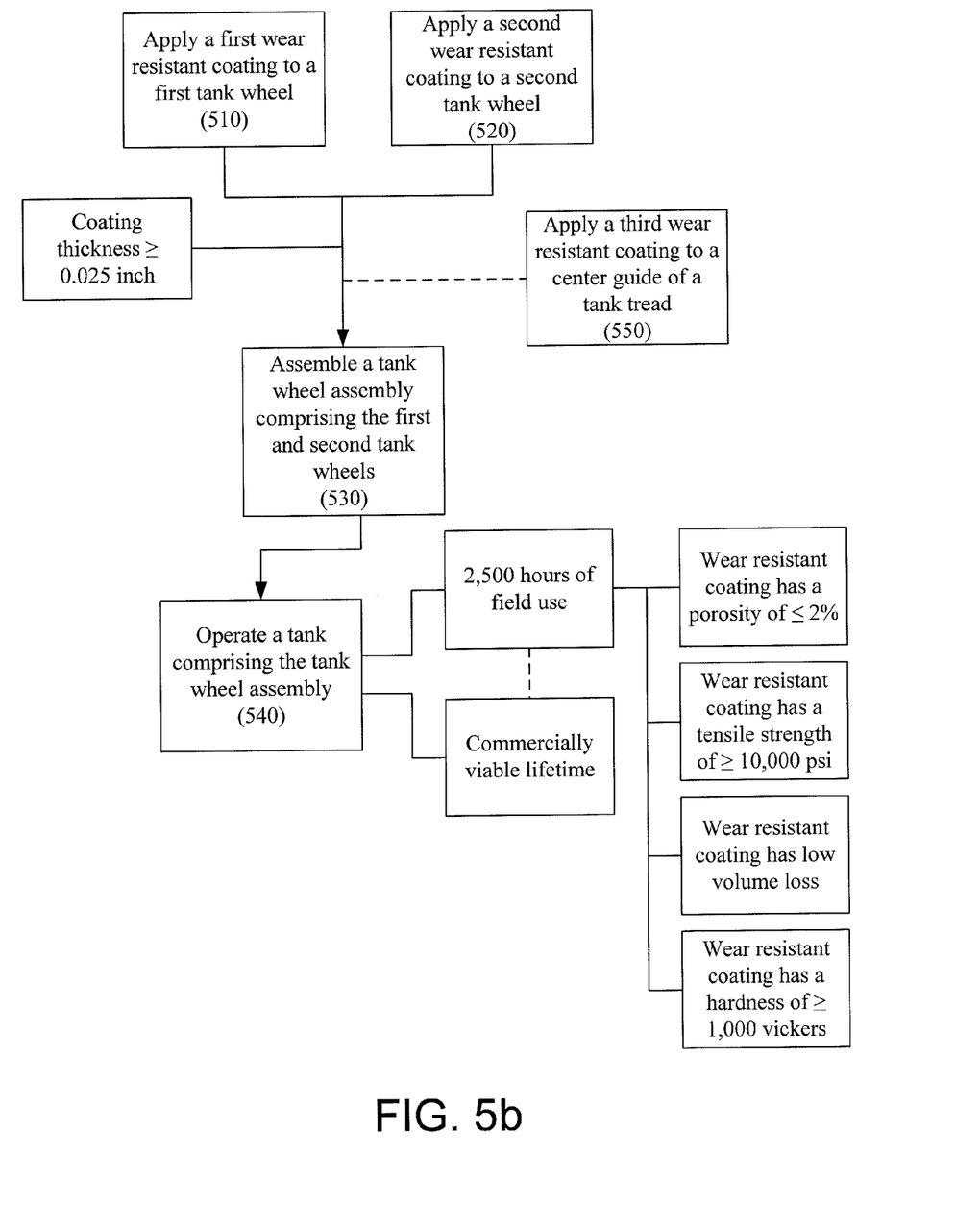
FIG. 5b is a flow chart of one embodiment of methods useful in producing wear resistant tank wheel assemblies.

In one aspect, and with reference now to FIG. 5b, after the applying steps (510) and (520) each of the first and second wear resistant coatings may have a thickness of at least about 0.025 inch. In one embodiment, after the assembling step (530), a first face of the first tank wheel faces a second face of the second tank wheel. In one embodiment, at least a portion of the first face and at least a portion of the second face define a guide tunnel and the guide tunnel is configured to receive a center guide of a tank tread. In one embodiment, the first and second wear resistant coatings restrict abrading of the first and second tank wheels due to movement of the center guide of the tank tread through the guide tunnel. The produced tank wheels may realize any of the properties described above; such as a porosity of not greater than 2%, a tensile yield strength of at least about 10,000 psi, a low volume loss during operation, and a hardness of at least 1,000 Vickers, to name a few. These properties may result in the tank wheels operating for at least 2500 hours of field use and having a commercially viable lifetime.

While various embodiments of the present disclosure have been described in detail, it is apparent that modifications and adaptations of those embodiments will occur to those skilled in the art. However, it is to be expressly understood that such modifications and adaptations are within the spirit and scope of the present disclosure.

What is claimed is:

1. A tank wheel assembly comprising:
   (a) a first tank wheel disposed about an axle;
   (b) a second tank wheel proximal the first tank wheel and disposed about the axle;
      wherein a first face of the first tank wheel faces a second face of the second tank wheel;
   (c) a guide tunnel defined by at least a portion of the first face and at least a portion of the second face;
      wherein the guide tunnel has outer surfaces and is configured to receive a center guide of a tank tread;
      wherein the guide tunnel and center guide at least partially maintain the tank tread on the tank wheel assembly;
   (d) a first wear resistant coating adhered to at least a portion of the outer surfaces of the guide tunnel, wherein the first wear resistant coating comprises at least one of an Fe-Balance alloy, a Ni-Balance alloy, and Colmonoy 88; and
   (e) a second wear resistant coating adhered to at least a portion of the center guide of the tank tread, wherein the second wear resistant coating comprises an iron oxinitride impregnated with a polymer;
   wherein the coefficient of friction between the first wear coating and the second wear coating is not greater than about 0.35, such that abrasion between the center guide of the tank tread and the guide tunnel is restricted, via the first wear coating on the guide tunnel and the second wear resistant coating on the center guide.

2. The tank wheel assembly of claim 1, wherein the first wear resistant coating restricts abrading of the outer surfaces of the guide tunnel for at least 2500 hours of field use.

3. The tank wheel assembly of claim 1, wherein not greater than 10 vol. % of the first wear resistant coating is lost when tested in accordance with ASTM G105-02.

4. The tank wheel assembly of claim 1, wherein not greater than 10 vol. % of the first wear resistant coating is lost when tested in accordance with ASTM G65-04.

5. The tank wheel assembly of claim 1, wherein the first wear resistant coating has a hardness of at least about 1000 Vickers.

6. The tank wheel assembly of claim 1, wherein the first wear resistant coating has a density of at least about 7.0 g/cm$^3$.

7. The tank wheel assembly of claim 1, wherein the first wear resistant coating has a porosity of not greater than about 2%.

8. The tank wheel assembly of claim 1, wherein the first wear resistant coating has a tensile yield strength of at least about 10,000 psi as measured in accordance with ASTM C633-01.

9. The tank wheel assembly of claim 1, wherein no visible pitting of at least one of the first tank wheel and second tank wheel having the wear resistant coating of at least 0.025 inch on its outer surface is realized when tested in accordance with ASTM B117-03, and wherein pitting is assessed on the coated surface only.

* * * * *